United States Patent

[11] 3,622,228

[72] Inventor Rockne Krebs
 1960 Biltmore St., Washington, D.C. 20009
[21] Appl. No. 860,726
[22] Filed Sept. 24, 1969
[45] Patented Nov. 23, 1971

[54] LIGHT REFLECTION APPARATUS
 3 Claims, 2 Drawing Figs.

[52] U.S. Cl. ........................................................ 350/299
[51] Int. Cl. ........................................................ G02b 5/08
[50] Field of Search ............................................ 350/160, 288, 299; 250/220–222

[56] References Cited
UNITED STATES PATENTS

| | | | |
|---|---|---|---|
| 2,417,092 | 3/1947 | Smith | 250/221 |
| 3,475,029 | 10/1969 | Hyman | 250/222 |
| 3,485,552 | 12/1969 | Adler | 350/160 |

Primary Examiner—David Schonberg
Assistant Examiner—Michael J. Tokar
Attorney—A. C. Smith ABSTRACT: Multiple reflections of a thin beam of light are used to establish imaginary boundaries within physically limited space for displays as well as for forming illusory architectural models having conveniently re-arrangeable boundaries.

PATENTED NOV 23 1971 3,622,228

INVENTOR
ROCKNE KREBS

BY  *G. C. Smith*

ATTORNEY 3,622,228

LIGHT REFLECTION APPARATUS

SUMMARY OF THE INVENTION

In accordance with the illustrated embodiments of the present invention, high-intensity light beams of substantially uniform small cross section are established between fixed reflectors to create illusions of imaginary boundaries that do not coincide with surrounding physical boundaries. In this way, imaginary architectural models of nonmaterial form may be conveniently formed and rearranged simply by altering the location of reflectors within the surrounding physical space. Also, the illusion of nonmaterial boundaries may be established within the surrounding physical space for display purposes.

DESCRIPTION OF THE PREFERRED EMBODIMENT

Figure 1:
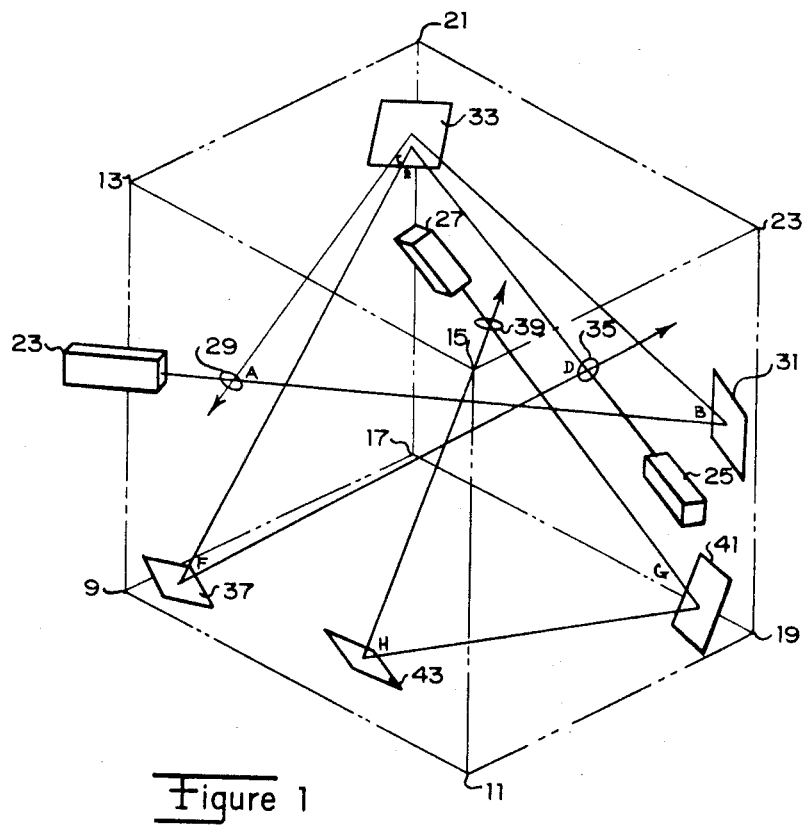
FIG. 1 is a pictorial view of one embodiment of the invention for producing open-area, closed forms bounded by light beams within an enclosure region.

Referring now to the pictorial diagram of FIG. 1, there is shown a structure having physical or material boundary surfaces which form some portion of the surroundings for the present invention and which are characterized as the sides of a cube having corners 9, 11, 13, 15, 17, 19, 21 and 23. This structure may, of course, be an ordinary room having one or more portals for convenient access. It should be understood, however, that since such surroundings merely provide mounting support for reflectors, such surrounding structure may have any shape or form including, but not limited to, polyhedrons, shapes of revolution or a grouping of posts or other substantially isolated, unconnected objects which serve merely to support reflectors.

In this embodiment of the invention, the illusion of nonmaterial boundaries may be established in any desired configuration by forming and reflecting thin beams of light around substantially closed paths that define the boundary planes or edges. Ideally, beams of high-intensity light should have thin, substantially uniform cross section over the entire path of the light beam in order to delineate sharply the edges of an illusory boundary thus established. Lasers 25, 27 and 29 may be used as the sources of light beams having these characteristics, as shown in FIG. 1. These lasers are disposed outside of the space or region which is visible within the surroundings 9–23, or at least are disposed outside of the region within the boundary planes which are formed by the light beams (as where a laser is disposed behind a reflector and both the laser and reflector are within the surroundings 9–23). In a preferred embodiment, a light beam from a laser 23, 25, 27 passes through an aperture 29 in one wall 9, 11, 13, 15 of the surroundings to impinge upon a reflector 31 which is supported on wall 11, 15, 19, 23. From there, the light beam is reflected to reflector 33 which is disposed near corner 17, 21 where it is reflected through the aperture 29. It is desirable to have the beam of light from the laser sources enter and leave the inner region of the surroundings 9–23 which is visible to an observer therein substantially at a common location so that only such portion of the path of the light beam that forms a closed figure A, B, C is visible to an observer. It should be understood, however, that portions of the beams of light from two or more light sources may be used to define such a closed figure and that the closed figure thus defined may include more than three sides. Indeed, where four or more sides are used to form a closed figure, the illusory boundary thus defined need not appear to be planar but may be arranged to appear twisted or distorted in its spatial orientation.

In similar manner, the light beams from laser 25 may enter the inner region of the surroundings through aperture 35 and be aligned to reflect from reflector 33 toward reflector 37. The light beam may then reflect from reflector 37 through aperture 35 to form a closed form D, E, F within the inner region of the surroundings. Also, the light beam from laser 27 may enter through aperture 39, reflect from reflector 41 toward reflector 43 and from there, be reflected through aperture 39 to produce the closed form G, H, I. These closed forms A, B, C, D, E, F, and G, H, I may, of course, be disposed in any desired relative positions either alone or in combination with additional such closed forms to provide an illusion of boundary surfaces in space which are different from the boundaries that form the surroundings 9–23. In practice, four-sided forms may be formed and arranged to define what may appear to be an oblique or converging or irregularly shaped enclosure into which or through which an observer may pass unimpeded.

Figure 2:
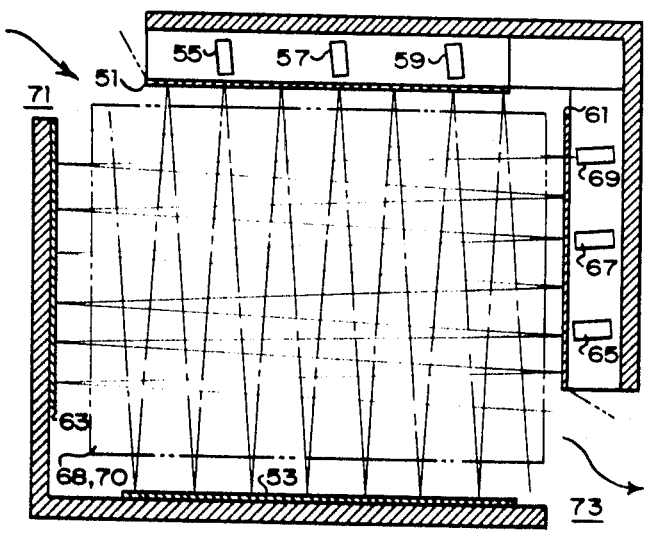
FIG. 2 is a top view of a passageway including pairs of spaced plane-parallel reflectors for producing the image of a region which extends without bounds in the directions of the spaced reflectors.

In another embodiment of the present invention, series of reflections of a narrow light beam are used to produce the illusion of a bounded region which extends well beyond the physical surroundings. One form of this embodiment, as shown in the top view of FIG. 2, uses a pair of spaced, plane-parallel reflectors 51 and 53 with narrow-beam light sources such as lasers 55, 57 and 59 disposed behind one of the reflectors 51. Each of the beams from the laser light sources passes through an aperture in the reflector 51 and may be aligned to pass through another aperture (say, one for an adjacent laser) after one or more reflections from reflectors 51 and 53. In the illustrated embodiment, such reflectors 51, 53 and light sources 55–59 are arranged to establish light beams which traverse the width of hall or entranceway to produce to an observer within the coplanar region of the reflectors 51 and 53 an illusion of lateral extension without limits of the walls of the hall or entranceway. In similar manner, another pair of spaced, coplanar reflectors 61 and 63 may be disposed in a direction that is generally skew or normal to the planes of reflectors 51 and 53. Laser light sources 65, 67 and 69 disposed behind one of the reflectors 61 produce light beams which pass through apertures in the reflector 61 and which, after one or more reflections between reflectors 61 and 63, may pass out of the inner or central region through another aperture (say, one for an adjacent laser). Additionally, another set of coplanar reflectors 68, 70, one serving as the floor and another serving as the ceiling, and another set of laser light sources may be arranged similar to that described in connection with the reflectors and light sources arranged on spaced walls. This embodiment, then, produces for an observer positioned between the pairs of reflectors the illusion that the region around him extends without bounds in all directions and that he is therefore suspended in space. This embodiment is thus ideally useful as an entryway into an exhibit of art, science, technology, or the like, and for this purpose passageways 71 and 73 may be provided in the walls of the surroundings to facilitate the movement of observers through the region.

It should be understood that it is not essential in these embodiments of the present invention that a beam of light pass out of the observation region through an aperture in a wall of the surroundings or that the beam reflections always be arranged within a plane. Thus, as in the embodiment of FIG. 2, the beams of light need not be disposed within a lineal pattern between pairs of reflectors but may be arranged off-normal to the coplanar reflectors so that the entire coplanar area of pairs of reflectors are illuminated by multiple beams and reflections. Also, a light-scattering medium may be introduced into the observation region formed in accordance with an embodiment of the present invention in order to enhance visibility of the light beams along their paths. Water vapor or dust particles, or the like, may be introduced into the observation region for this purpose and may be particularly desirable to use to scatter the light beams from lasers which have beam power output levels that are sufficiently low for safe viewing by an observer.

We claim:

1. Light-reflecting apparatus which produces for an observer the visible appearance of boundaries of a region in space that do not coincide with the actual boundaries about the observer, the apparatus comprising:

an arrangement of physical elements disposed about a selected region;

a source of visible light in a beam having a substantially constant cross-sectional area along the path thereof, the source of light being supported with respect to said physical elements substantially out of said region;

means providing an optical pathway into said region for the visible light beam from said source out of said region; and a plurality of reflectors disposed in said region and arranged along the path of the visible light beam from said source and forming reflection corners along the path of the visible light beam for altering the direction thereof to form within said region a plurality of nonorthogonally skewed planes defined by the incident and reflected portions of the light beam present at the associated reflectors and a light scattering medium disposed in the region within the arrangement of elements for scattering light along the path of said visible light beam to enhance the visibility of said light beam along the path thereof; and wherein said source is a laser which produces the beam of visible light.

2. Light-reflecting apparatus as in claim 1 wherein:

the path of the light beam from said source passes through an aperture in an element disposed about said region and is incident upon one of said plurality of reflectors and is reflected therefrom toward a succeeding one of said plurality of reflectors; and the last reflector in a succession of reflectors disposed along the path of the light beam from said source reflects the light beam incident thereon from a preceding reflector substantially toward the optical pathway into said region to define a closed form within said region.

3. Light-reflecting apparatus which produces for an observer the visible appearance of boundaries of a region in space that do not coincide with the actual boundaries about the region, the apparatus comprising:

an arrangement of physical elements disposed about a selected region;

a laser light source supported with respect to said physical elements substantially out of said region for producing a beam of visible light;

means providing an optical pathway into said region for the visible light beam from said laser source substantially outside said region;

a plurality of reflectors disposed in said region and arranged along the path of the visible light beam from said laser source for forming reflection corners along the path of the visible light beam to alter the direction thereof to produce within said region a plurality of skewed planes defined by the incident and reflected portions of the light beam present at the associated reflectors; and a light-scattering medium disposed within said region for scattering light along the path of the visible light beam to enhance the visibility thereof within said region.

* * * * *